US008990080B2

(12) United States Patent
Varkey et al.

(10) Patent No.: US 8,990,080 B2
(45) Date of Patent: Mar. 24, 2015

(54) TECHNIQUES TO NORMALIZE NAMES EFFICIENTLY FOR NAME-BASED SPEECH RECOGNITION GRAMMARS

(75) Inventors: Mini Varkey, Redmond, WA (US); Bernardo Sana, Redmond, WA (US); Victor Boctor, Redmond, WA (US); Diego Carlomagno, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 13/359,919

(22) Filed: Jan. 27, 2012

(65) Prior Publication Data
US 2013/0197906 A1 Aug. 1, 2013

(51) Int. Cl.
*G10L 15/00* (2013.01)
*G10L 15/19* (2013.01)

(52) U.S. Cl.
CPC ..................................... *G10L 15/19* (2013.01)
USPC .......................................... 704/234; 704/244

(58) Field of Classification Search
None
See application file for complete search history.

(56) References Cited

U.S. PATENT DOCUMENTS

| 5,621,859 | A | 4/1997 | Schwartz et al. | |
|---|---|---|---|---|
| 5,761,640 | A * | 6/1998 | Kalyanswamy et al. | 704/260 |
| 6,973,429 | B2 | 12/2005 | Smith | |
| 8,190,538 | B2 * | 5/2012 | Zhang et al. | 706/12 |
| 8,229,737 | B2 * | 7/2012 | Williams | 704/9 |
| 8,706,474 | B2 * | 4/2014 | Blume et al. | 704/7 |
| 2002/0133344 | A1 * | 9/2002 | Damiba | 704/247 |
| 2002/0188447 | A1 | 12/2002 | Coon et al. | |
| 2003/0046077 | A1 | 3/2003 | Bakis et al. | |
| 2003/0225571 | A1 * | 12/2003 | Levin et al. | 704/201 |
| 2004/0093201 | A1 * | 5/2004 | Levin et al. | 704/201 |
| 2004/0230637 | A1 | 11/2004 | Lecoueche et al. | |
| 2006/0129396 | A1 * | 6/2006 | Ju et al. | 704/243 |
| 2008/0114595 | A1 | 5/2008 | Vair et al. | |

OTHER PUBLICATIONS

"Open Speech Recognizer—An Intelligent, Scalable, and Comprehensive Speech Recognition Solution from SpeechWork", retrieved at <<http://www.voice-community.de/write/doc/SCSFT_OSR.pdf>> Jun. 2005, pp. 1-20.

Jurafsky, et al., "Using a Stochastic Context-Free Grammar As A Language Model For Speech Recognition", Retrieved at <<http://www.stanford.edu/~jurafsky/icassp95-tc.pdf>> In the proceedings of ICASSP-95, May 1995 (09-12), pp. 4.

* cited by examiner

*Primary Examiner* — Daniel D Abebe
(74) *Attorney, Agent, or Firm* — Louise Bowman; Peter Taylor; Micky Minhas

(57) ABSTRACT

Techniques to normalize names for name-based speech recognition grammars are described. Some embodiments are particularly directed to techniques to normalize names for name-based speech recognition grammars more efficiently by caching, and on a per-culture basis. A technique may comprise receiving a name for normalization, during name processing for a name-based speech grammar generating process. A normalization cache may be examined to determine if the name is already in the cache in a normalized form. When the name is not already in the cache, the name may be normalized and added to the cache. When the name is in the cache, the normalization result may be retrieved and passed to the next processing step. Other embodiments are described and claimed.

20 Claims, 7 Drawing Sheets

TECHNIQUES TO NORMALIZE NAMES EFFICIENTLY FOR NAME-BASED SPEECH RECOGNITION GRAMMARS

BACKGROUND

A name-based speech grammar provides data to a speech recognition system on how to recognize names. A name-based speech grammar may be used, for example, by a speech recognition system in a mobile device, such as a smart phone, to allow the user of the device to perform an action related to a name. One component of name-based speech grammar generation is name normalization. Name normalization may be performed to determine the pronunciation of a name. Some names may have several possible pronunciations. For example, "conference room 123" may be pronounced as "conference room one hundred twenty three", "conference room one twenty three", or "conference room one two three." Name normalization can add substantial time and processing resources to name-based speech grammar generation. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to normalize name-based speech recognition grammars. Some embodiments are particularly directed to techniques to normalizing name-based speech recognition grammars more efficiently by caching, and on a per-culture basis. In one embodiment, for example, a technique may comprise receiving a name for normalization, during name processing for a name-based speech grammar generating process. A normalization cache may be examined to determine if the name is already in the cache in a normalized form. When the name is not already in the cache, the name may be normalized and added to the cache. When the name is in the cache, the normalization result may be retrieved and passed to the next processing step. Caching normalization results may greatly reduce the time and processing expense of name normalization and grammar generation. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Speech recognition is an increasingly useful tool for interacting with computing devices, in particular, mobile devices such as smart phones. Speech recognition may be computationally intensive and may use large amounts of storage for speech grammars. Consequently, many mobile devices send speech recognition tasks to a remote device, such as a speech recognition server. The mobile device may receive the recognized result as text and/or another format usable by the mobile device. This may allow the mobile device to, for example, look up a contact phone number or an e-mail address for the user without making the user navigate to a search input and type in the contact name. This type of service uses, at least, a name-based speech grammar that allows the speech recognizer to recognize a name from a speech input, and provide the name in a way that the mobile device can locate the name in a contact list. The embodiments are not limited to this context.

Various embodiments are directed to techniques to improve efficiency in building a name-based speech grammar, in particular, during a name normalization process. Name normalization is expensive, computationally, and takes a lot of time. In a given culture, e.g. American English, or France French, many names occur frequently. Embodiments take advantage of this reoccurrence by caching normalization results. When a name-based speech grammar (NSG) is being built for a set of names, a normalization cache may be checked for the name being processed. When the name is in the normalization cache, the normalization step can be avoided by using the cached normalization result. As a result, the embodiments can improve efficiency and NSG grammar generation time for a client services system.

Figure 1:
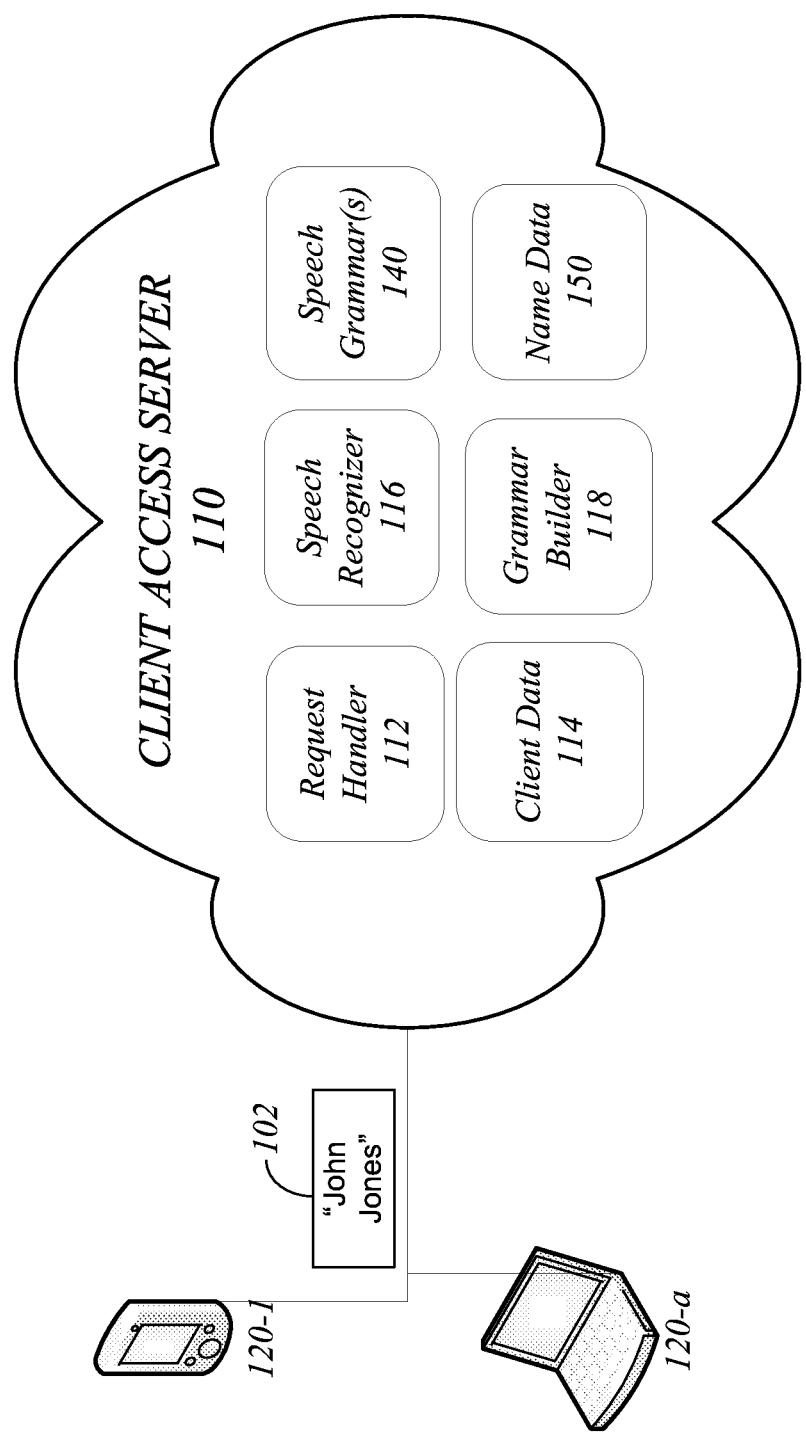
FIG. 1 illustrates an embodiment of a first system for generating and using a name-based speech grammar.

FIG. 1 illustrates a block diagram for a system 100 for generating and using a name-based speech grammar. In one embodiment, for example, the system 100 may comprise a computer-implemented system 100 having multiple components, such as a client access server 110 and client devices 120-1, 120-a (collectively, client devices 120). As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

In various embodiments, the system 100 may comprise a client access server 110. Client access server 110 may include one or more devices that include applications and data to provide one or more services to client applications and devices. In an embodiment, client access server 110 provides a service that may receive and respond to speech information. In an embodiment, client access server 110 may provide, for example, e-mail service, telephone service, voice mail service, personal information management service, calendaring service, contact management service, and so forth. The embodiments are not limited in this context.

In an embodiment, client access server 110 may be implemented with a cloud computing model. In a cloud computing model, applications and services may be provided as though the applications and data were on a local device, without having to install the applications and/or store the data on a local device. However, the applications and/or data storage may be implemented across many devices, servers, and data stores, accessible over a communication interface from a local device. In a cloud computing model, client access server 110 may be physically embodied on one or more servers, and in one or more physical locations. Client access server 110 may be a sub-component of a larger cloud computing implementation of a group of services. Regardless of physical configuration, client access server 110 may appear, logically, as one device or system to external entities, such as client devices 120.

In an embodiment, client access server 110 may include a request handler 112. Request handler 112 may receive requests for data and/or services from a client device 120. Request handler 112 may be a web browser application. Request handler 112 may be an application program interface (API). Request handler 112 may be capable of receiving a request such as a hypertext protocol (HTTP) request. In an embodiment, the request may include a request for speech recognition.

In an embodiment, client access server 110 may include client data 114. Client data 114 may include any data related to providing a service to a client. Client data 114 may include, for example, mailbox data for providing an e-mail service. Client data 114 may include, without limitation, contact information, calendar information, voicemail information, and so forth.

In an embodiment, client access server 110 may include a speech recognizer 116. Speech recognizer 116 may be an application or component that receives speech in the form of audio speech data 102 and converts the audio speech data 102 into a text representation of the speech. Speech recognizer 116 may refer to one or more speech grammars 140 to perform the recognition process. The embodiments are not limited to these examples.

In an embodiment, client access server 110 may include a grammar builder 118. Grammar builder 118 may generate the one or more speech grammars 140. In an embodiment, one of the speech grammars 140 generated by grammar builder 118 may be a name-based speech grammar (NSG). An NSG may be generated from name data 150. Grammar builder 118 is described further with respect to FIG. 3. In an embodiment, multiple speech grammars 140 may be generated by grammar builder 118 and used by speech recognizer 116. A speech grammar 140 may be generated for each different culture represented in name data 150, for example. That is, there may be one speech grammar 140 for English, one speech grammar 140 for French, and so forth. In particular, there may be separate NSGs for each culture, as names are often specific to one culture.

Name data 150 may include a set of names that may be relevant to a client of client access server 110. For example, name data 150 may include a corporate directory, professional contact list, or personal contact list. In addition to names of people, name data 150 may also include, for example, location names, street names, city names, e-mail addresses, conference room names, and so forth. Name data 150 may also include numbers. Numbers may be used alone, for example in a phone number, or may be components of names, for example "Conference Room 123." Numbers, as names, can be particularly resource-intensive to normalize, as there can be many variants of a number in speech. The number "123", for example, may be spoken, in English, as "one hundred twenty three", "one two three", and "one twenty three." A speech recognizer would have to be able to convert any of these variants into the correct number, and the speech grammar would have to contain a pattern for each variant. In an embodiment, name data 150 may be in a format that is used by the applications that use name data 150, such as an e-mail application or contact application, and not, for example, in a speech grammar format.

In various embodiments, the system 100 may comprise client devices 120-1, and 120-a, where a represents a positive integer. Client devices 120 may include any electronic devices capable of receiving voice information and communicating with client access server 110. The voice information may be received from a user through a microphone, or may be an audio file stored on client device 120. Client devices 120 may include applications (not shown) that may communicate with client access server 110 to receive or send data, and perform various functions. Such an application may include an e-mail client application, a calendar application, a contact management application, and so forth.

The components of client access server 110 shown in FIG. 1, e.g. 112, 114, 116, 118, speech grammar 140 and name data 150 may be located on one server or may be distributed across a plurality of servers and data stores. The embodiments are not limited to these examples.

Figure 2:
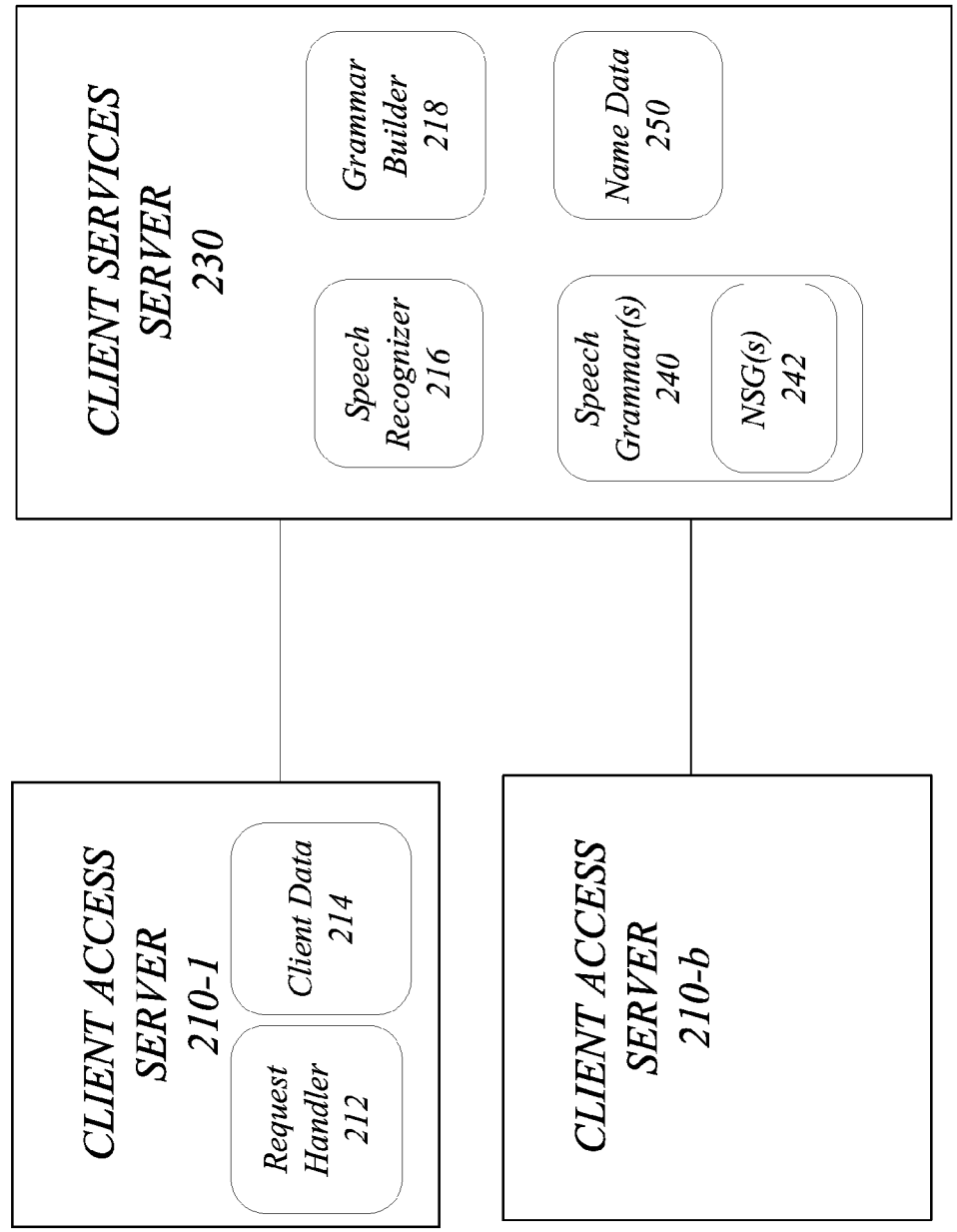
FIG. 2 illustrates an embodiment of a second system for generating and using a name-based speech grammar.

FIG. 2 illustrates a block diagram of a system 200 for generating and using a name-based speech grammar. System 200 may be similar to system 100. Request handler 212 and client data 214 may be representative of request handler 112 and client data 114, respectively. Speech recognizer 216 and grammar builder 218 may be representative of speech recognizer 116 and grammar builder 218, respectively. Clients 220 may be representative of clients 120.

In system 200, client access server 210-1 may be separate from a client services server 230. Client access server 210-1 may still receive requests for client data 214. Client access server 210-1 may be, for example, an email server provided by a first business entity. Services, however, such as speech recognition services, may be provided from a different source, e.g. client services server 230. System 200 may include additional client access servers 210-b, where b represents any positive integer. The additional client access servers 210-*b* may be provided by other entities, such as another business, a government agency, an academic entity and so forth.

Client services server 230 may provide services including speech recognition to multiple, unrelated clients such as client access server 210-1 and 210-*b*. In an embodiment, client services server 230 may construct speech grammars 240 from name data 250 compiled from multiple sources. In an embodiment, name data 250 may be received from the multiple sources and stored with client services server 230, either consolidated into one data store, or in separate logical data stores for each separate entity. In an embodiment, name data 250 may be provided on-the-fly to client services server 230 for the generation of speech grammars 240 without being stored by client services server 230 beyond the speech grammar 240 generation.

In an embodiment, grammar builder 218 may generate one NSG 242 for all of client services server 230's client entities such as client access servers 210-1, 201-*b*. In an embodiment, grammar builder 218 may generate separate NSGs 242 specific to each client entity. In an embodiment, grammar builder 218 may generate one normalization cache (not shown) that contains normalization results for all of the client entities. In an embodiment, grammar builder 218 may build separate normalization caches for each client entity. The embodiments are not limited to these examples.

Figure 3:
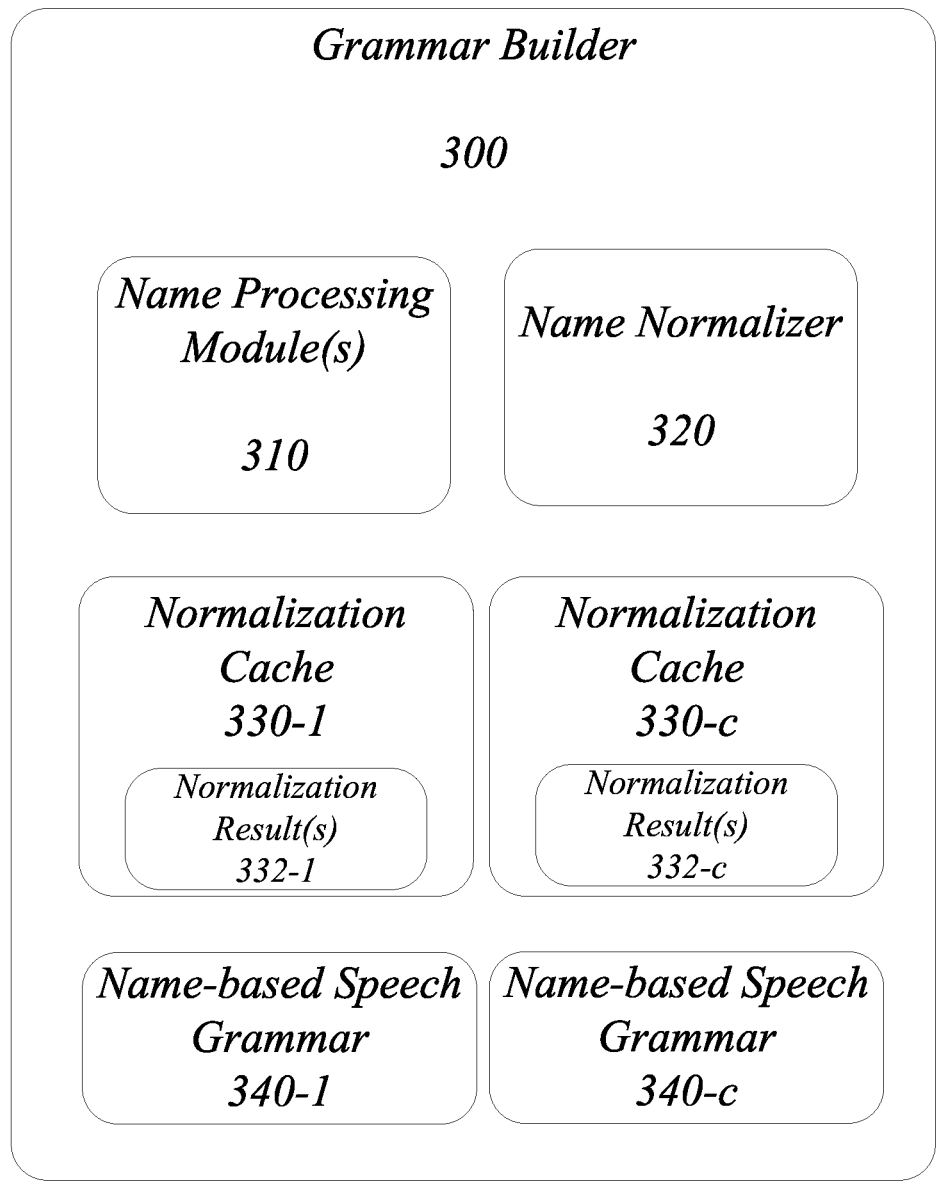
FIG. 3 illustrates an embodiment of a grammar builder.

FIG. 3 illustrates a block diagram of a grammar builder 300. Grammar builder 300 may be a representative example of grammar builder 118, 218. Grammar builder 300 may include one or more components, such as name processing modules 310, and a name normalizer 320. The functions of grammar builder 300 may be implemented with more or other components and are not limited to this example.

In various embodiments, grammar builder 300 may include name processing modules 310. Name processing modules 310 may include one or more modules to perform various steps in generating a name-based speech grammar, not including a name normalization step. Name processing modules 310 may include pre-normalization steps and/or post-normalization steps. A pre-normalization step may be, for example, speech grammar filter list processing. A speech grammar filter list may include a list of patterns, and each pattern may include a regular expression. When a name from name data 150, 250 matches a regular expression in a pattern, the name may be transformed as specified in the pattern's output. For example, one pattern may match names that include a bracketed description. The pattern may output the name with the bracketed expression removed. Additional or alternate name processing modules 310 may be included as needed for name-based speech grammar generation.

In various embodiments, grammar builder 300 may include name normalizer 320. Name normalizer 320 may perform name normalization for the building of a name-based speech grammar. Name normalization may start with name data 150, 250, e.g. a corporate employee directory, and determine pronunciations of a name.

Name normalizer 320 may, in some embodiments, read a name from name data 150, 250. In an embodiment, name normalizer 320 may split the name into component parts, e.g. words, such as first name, last name, middle name, middle initial, and suffix. When name data 150, 250 also includes other types of data, such as addresses and room numbers, those "names" may also be split into component parts, such as street or room number, conference room name, street name, city name, state name and so forth. In an embodiment, name data 150, 250 may include names already in a component form when name normalizer 320 reads a name from name data 150, 250.

In an embodiment, name normalizer 320 may receive a name from a pre-normalization processing step from a name processing module 310. Name normalizer 320 may call or execute one or more sets of instructions, such as functions, routines, applets, scripts and so forth, to perform the name normalization.

In an embodiment, name normalizer 320 may first check a normalization cache 330-1 to see if the currently selected name or name component has already been normalized and placed in normalization cache 330-1. When the currently selected name has already been normalized, it may be in stored in normalization cache 330-1 as a normalization result 332-1. When the name is not present in normalization results 332-1, name normalizer 320 may proceed with the normalization process, after which the now-normalized currently selected name may be placed in normalization cache 330-1.

In an embodiment, normalization cache 330 may include a mapping of a name to a normalization result. The normalization results 332 may include the normalized name. In an embodiment, the normalization results 332 may instead or additionally include a Boolean value for a name, where the Boolean value indicates whether a name has multiple pronunciations. In some embodiments, names having multiple pronunciations may be excluded from the name-based speech grammar in order to restrict the size of the grammar.

In an embodiment, grammar builder 300 may comprise, or maintain, multiple normalization caches 330-*c*, where c represents a positive integer, one normalization cache for each language culture for which a name-based speech grammar is needed. Names tend to re-occur on a per-culture basis. For example, "John" occurs frequently in English, "Jean" occurs frequently in French, and "Jose" occurs frequently in Spanish. Each normalization cache 330-1, 330-*c* may have, therefore, its own set of normalization results 332-1, 332-*c*, respectively.

In an embodiment, a normalization cache 330-1 may be persisted on a memory beyond the generation of one name-based speech grammar. That is, it may be stored on a non-volatile memory to be available for subsequent grammar building processes. In an embodiment, a normalization cache 330-1 may be persisted in memory, typically volatile memory, for the duration of the generation of one (or one set of) name-based speech grammar(s), but may be discarded at the end of the generation process.

Normalization results 332 may be provided to a next step in the name-based speech grammar generation process, to one of name processing modules 310. At the end of the generation process, a name-based speech grammar 340-1, 340-*c* may be generated for each culture existing in name data 150, 250.

The components of grammar builder 300, such as name processing modules 310 and name normalizer 320, may be communicatively coupled via various types of communications media. The components 310, 320 may coordinate operations between each other. The coordination may involve the uni-directional or bi-directional exchange of information. For instance, the components 310, 320 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
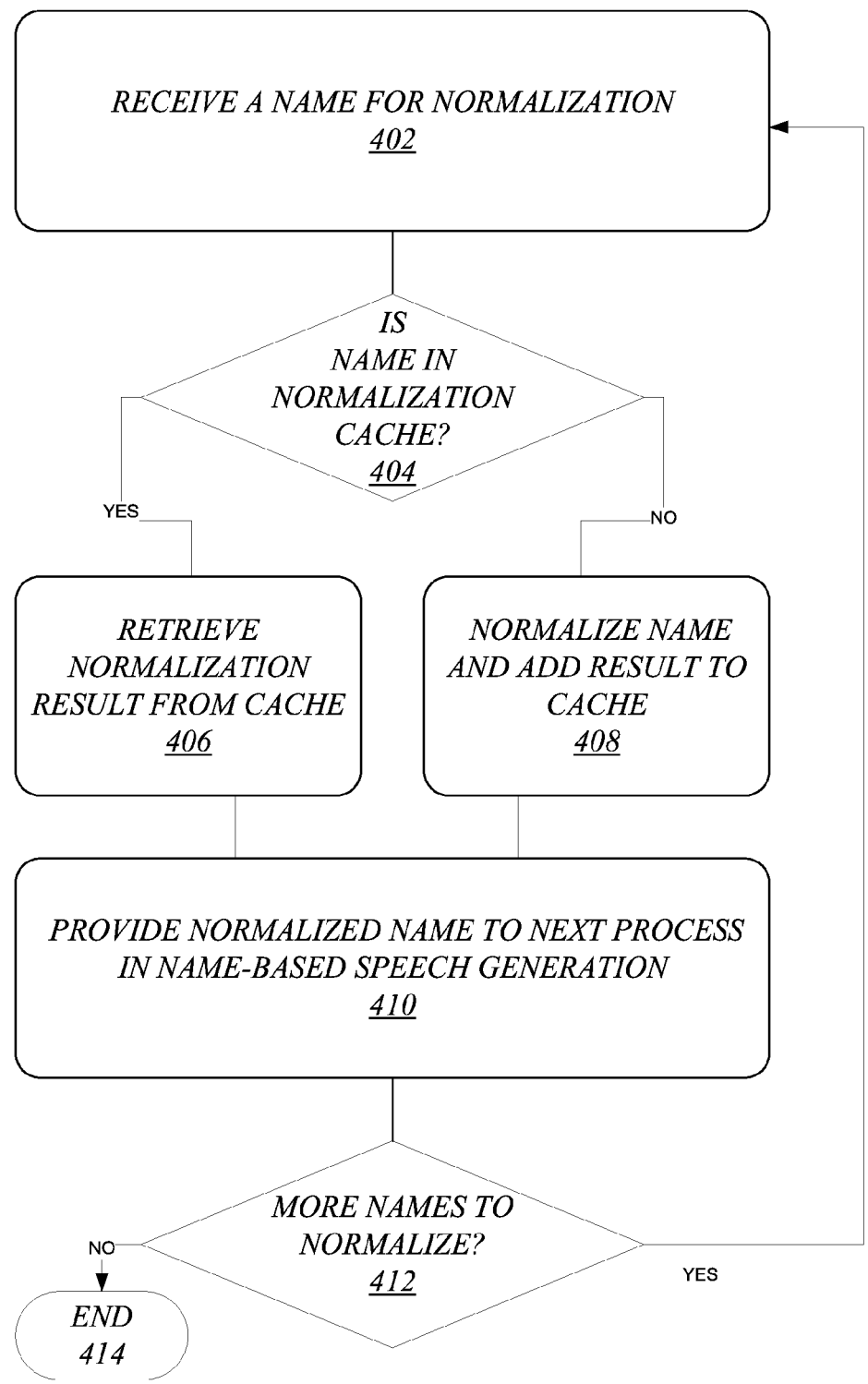
FIG. 4 illustrates an embodiment of a logic flow to normalize names during speech grammar generation.

FIG. 4 illustrates one embodiment of a logic flow 400. The logic flow 400 may be representative of some or all of the operations executed by one or more embodiments described herein. Logic flow 400 may represent a normalization process during name-based speech grammar generation.

In the illustrated embodiment shown in FIG. 4, the logic flow 400 may receive a name for normalization at block 402. For example, name normalizer 320 may receive a name from another name processing module 310, or from name data 150, 250. The name may be a component of a name, a full name, a person's name, a number, an e-mail address, an internal address, a telephone number, a street address, a city name, a country name, a title, a nickname, and so forth. In an embodiment, the name may be specific to, or associated with, a culture.

The logic flow 400 may determine whether the name is in a normalization cache at block 404. For example, name normalizer 320 may check normalization cache 330-1 to see if the name is present in the normalization cache in normalized form.

The logic flow 400 may retrieve the normalization result from the normalization cache at block 406, when the name is in the normalization cache. For example, name normalizer 320 may read the normalization result from normalization results 332-1.

The logic flow 400 may normalize the name and add the normalization result to the normalization cache at block 408 when the name was not in the normalization cache. For example, name normalizer 320 may proceed with normalization, for example, by calling or executing one or more sets of instructions to normalize the name. Once the name is normalized, it may be added to normalization cache 330-1 as a normalization result 332-1. Name normalizer 320 may also retain the normalization result to pass to a next process.

The logic flow 400 may provide the normalization result to the next process in a name-based speech generation process at block 410. For example, name normalizer 320 may provide the normalization result, either retrieved from the normalization cache 330 or just normalized, to a post-normalization name processing module 310.

The logic flow 400 may determine whether there are additional names to normalize at block 412. Name normalizer 320 may receive another name from a pre-normalization name processing module 310, and may repeat logic flow 400 beginning at block 402. When name normalizer 320 stops receiving names, meaning that there are no additional names to normalize, logic flow 400 may end at block 414.

Further name processing and speech grammar generation processes make occur after block 414 to produce a name-based speech grammar for a culture (not shown). In an embodiment, logic flow 400 may be repeated for each culture that has names to be normalized for a culture-specific name-based speech grammar.

In an embodiment, a normalization cache 330-*b* may not have enough storage space allocated to it to store every normalization result from name data 150, 250. In such a case, name normalizer 320 may only write normalization results to normalization cache 330 when a name occurs more frequently in a culture. Name normalizer 320 may keep track of the relative frequency of occurrence of the names, and may only store names that occur above a certain threshold frequency. In an embodiment, all normalization results may be stored until the normalization cache is full, at which point the lower frequency names may be overwritten with the more frequently occurring names when needed.

In an embodiment, grammar builder 300 may be tasked with generating or regenerating a speech grammar on a daily basis, or at some other periodic interval.

Figure 5:
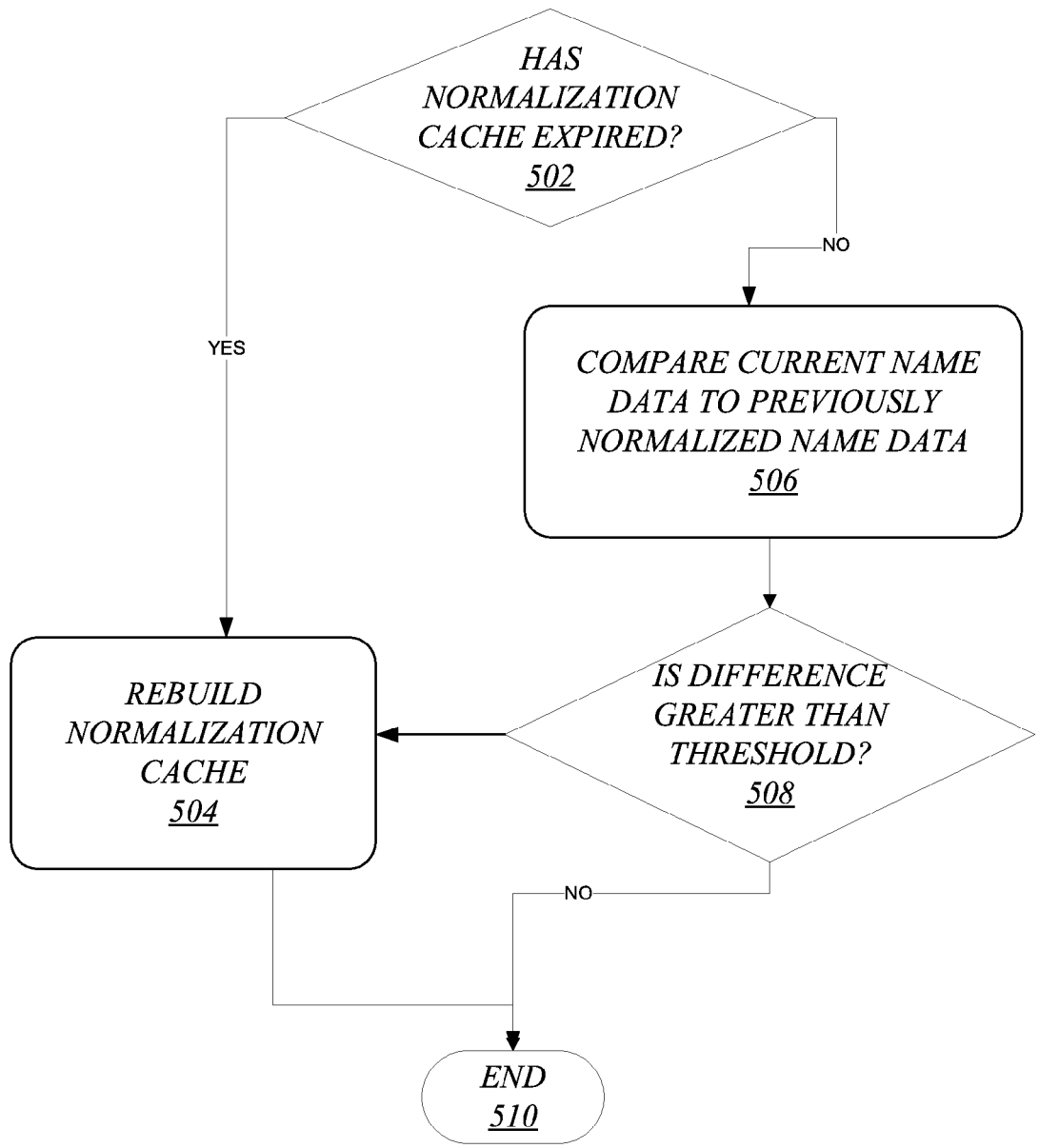
FIG. 5 illustrates an embodiment of a logic flow to determine when to rebuild a normalization cache.

FIG. 5 illustrates one embodiment of a logic flow 500. The logic flow 500 may be representative of some or all of the operations executed by one or more embodiments described herein. Logic flow 500 may represent a process of determining when to update normalization cache 330.

In an embodiment, logic flow 500 may determine whether an expiration date for a normalization cache has expired in block 502. In an embodiment, normalization cache 330 may be assigned an expiration date, for example, by name normalizer 320 or by grammar builder 300. In an embodiment, grammar builder 300 may be tasked with generating or regenerating a speech grammar on a daily basis, or at some other periodic interval, so the expiration date may be set, for example, to be a longer period than the grammar generating interval, in order to maximize the benefits of using the normalization cache.

In an embodiment, when the normalization cache has expired, logic flow 500 may rebuild the normalization cache in block 504. In an embodiment, this may occur during the process of building a speech grammar. The contents of the normalization cache may be effectively deleted, for example, by clearing, or zeroing, the cache, or by marking all of the storage bits used for the normalization cache as available for overwriting. The embodiments are not limited to these examples.

In an embodiment, when the normalization cache has not expired, or when an expiration date is not used, logic flow 500 may compare the current name data to the name data that was previously normalized in block 506. For example, the current copy of a corporate directory may be compared to an archived copy of the corporate directory from when the normalization cache was last generated.

In an embodiment, when the difference in the two versions of the name data exceeds a threshold, in block 508, logic flow 500 may rebuild the normalization cache in block 504. For example, when a corporation has a group of newly hired and/or newly laid-off employees, the corporate directory may change. At a threshold of, for example, five or ten percent difference, the normalization cache may be rebuilt. Otherwise, the normalization cache is not rebuilt and logic flow 500 ends at block 510.

In some embodiments, determining when to rebuild the normalization cache may depend just on an expiration date, e.g. blocks 502 and 504 alone. In some embodiments, determining when to rebuild the normalization cache may depend just on a different threshold, e.g. blocks 506, 508 and 504 alone. The embodiments are not limited to these examples.

In an embodiment, generating a speech grammar for 450,000 names and twenty-six different cultures without using a normalization cache took about thirty hours. When a persistent normalization cache was used with the same input data, the time needed to generate the speech grammar was only about 30 minutes. When a normalization cache that was generated on-the-fly, that is, not persisted beyond the normalization process, was used with the same input data, the time needed to generate the speech grammar was about eleven hours.

Figure 6:
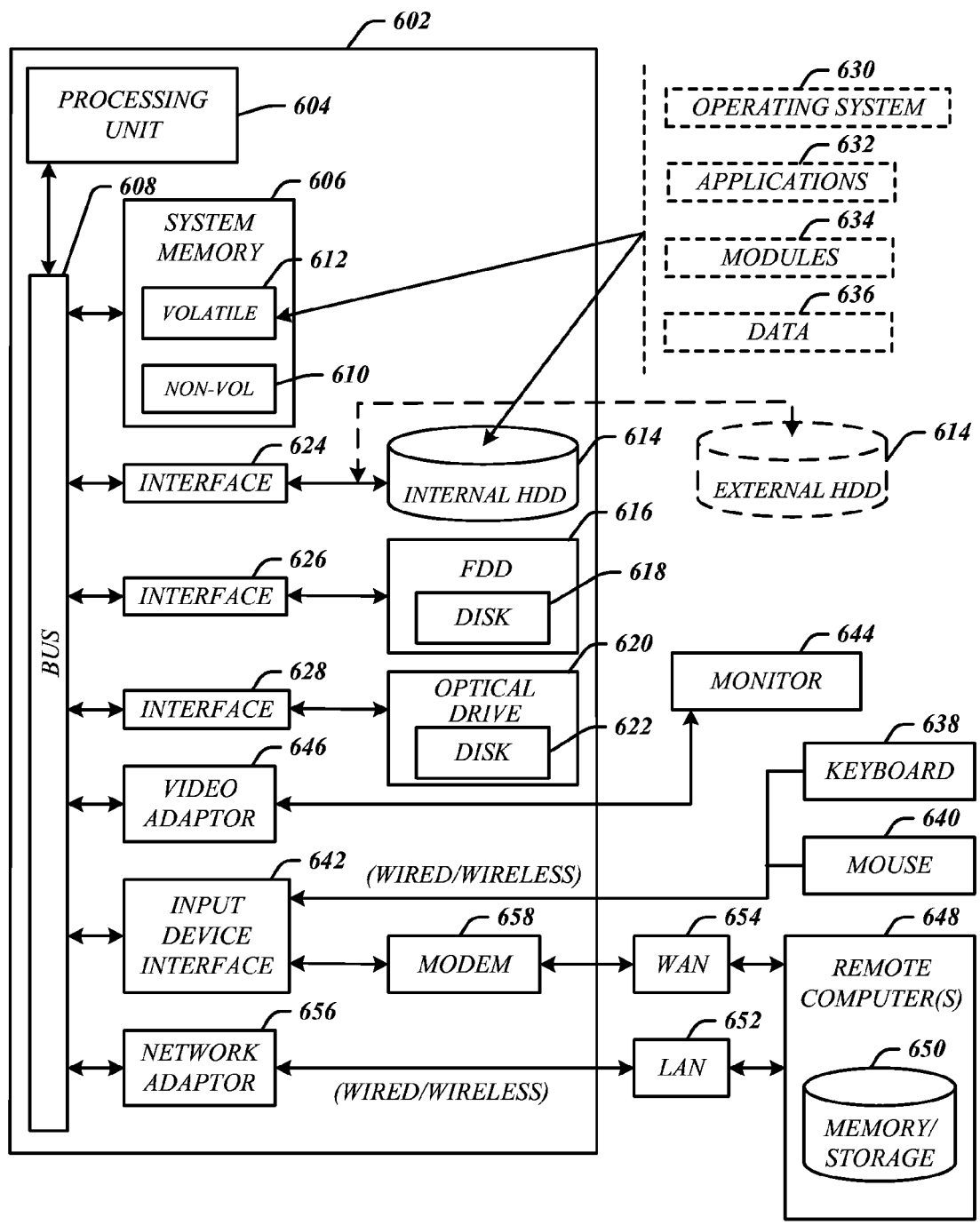
FIG. 6 illustrates an embodiment of a computing architecture.

FIG. 6 illustrates an embodiment of an exemplary computing architecture 600 suitable for implementing various embodiments as previously described. The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The system memory 606 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable storage media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. The one or more application programs 632, other program modules 634, and program data 636 can include, for example, grammar builder 118, 218, 300, name processing modules 310, name normalizer 320 and speech recognizer 116, 216.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 7:
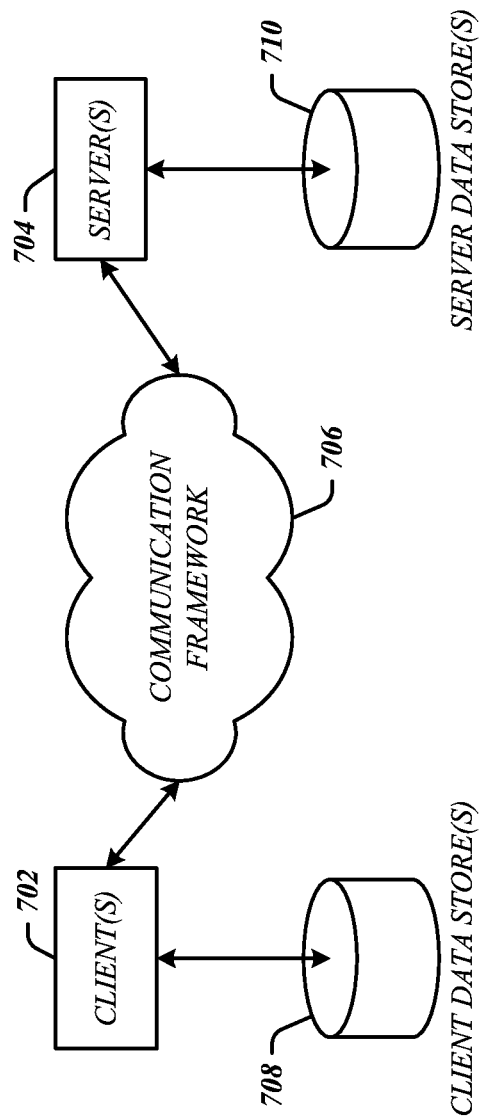
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 may implement the client devices 120, 220, and in some embodiments, client access server 210. The servers 704 may implement the server systems for client access server 110, 210 and client services server 230. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 702 and the servers 704 may include various types of standard communication elements designed to be interoperable with the communications framework 706, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 702 and a server 704 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   receiving a name for normalization during a name-based speech grammar generation;
   checking a normalization cache for the received name;
   normalizing the received name and adding the normalization result to the normalization cache, when the received name is not in the normalization cache;
   retrieving the normalization result from the normalization cache;
   providing the normalization result to a next process in the name-based speech grammar generation;
   maintaining a plurality of normalization caches, where each normalization cache corresponds to a different culture; and
   providing a normalization result in a culture to the next process in a name-based speech recognition grammar generation specific to that culture.

2. The method of claim 1, further comprising:
   dividing a received name into component names;
   checking the normalization cache for each component name separately;
   normalizing each name component separately and adding the normalization result component to the normalization cache, when the name component is not in the normalization cache;
   retrieving the normalization result component from the normalization cache; and
   providing the normalization result component to a next process in the name-based speech grammar generation.

3. The method of claim 1, further comprising:
   persisting the normalization cache in a volatile memory.

4. The method of claim 1, further comprising:
   persisting the normalization cache on a non-volatile computer-readable storage medium.

5. The method of claim 4, further comprising:
   assigning an expiration date to the normalization cache; and
   rebuilding the normalization cache when a date exceeds the expiration date.

6. The method of claim 4, further comprising:
   comparing the names in a current version of a source of names to a version of the source of names from a time when the normalization cache was generated; and
   rebuilding the cache when a difference between the versions of the source of names exceeds a threshold.

7. The method of claim 1, wherein a name comprises at least one of:
   a component of a name, a full name, a person's name, a number, an e-mail address, an internal address, a telephone number, a street address, a city name, a state name, a country name, a nickname, a suffix, a title, or an initial.

8. The method of claim 1 wherein each different culture is a different language culture.

9. An article comprising a computer readable storage device comprising instructions that when executed cause a system to:
   check a normalization cache for a name received during a name-based speech grammar generation;
   normalize the received name and add the normalization result to the normalization cache, when the received name is not in the normalization cache;
   retrieve the normalization result from the normalization cache;
   provide the normalization result to a next process in the name-based speech grammar generation;
   maintain a plurality of normalization caches, where each normalization cache corresponds to a different culture; and
   provide a normalization result in a culture to the next process in a name-based speech recognition grammar generation specific to that culture.

10. The article of claim 9, the medium further comprising instructions that when executed cause the system to:
    divide a received name into component names;
    checking the normalization cache for each component name separately;
    normalize each name component separately and add the normalization result component to the normalization cache, when the name component is not in the normalization cache;
    retrieve the normalization result component from the normalization cache; and
    provide the normalization result component to a next process in the name-based speech grammar generation.

11. The article of claim 9, the medium further comprising instructions that when executed cause the system to:
    persist the normalization cache on a non-volatile computer-readable storage medium.

12. The article of claim 11, the medium further comprising instructions that when executed cause the system to:
    assign an expiration date to the normalization cache; and
    rebuild the normalization cache when a date exceeds the expiration date.

13. The article of claim 11, the medium further comprising instructions that when executed cause the system to:
    compare the names in a current version of a source of names to a version of the source of names from a time when the normalization cache was generated; and
    rebuild the cache when a difference between the versions of the source of names exceeds a threshold.

14. The article of claim 9, wherein a name comprises at least one of:
    a component of a name, a full name, a person's name, a number, an e-mail address, an internal address, a telephone number, a street address, a city name, a state name, a country name, a nickname, a suffix, a title, or an initial.

15. The article of claim 9 wherein each different culture is a different language culture.

16. An apparatus, comprising:
a processing unit;
a memory to store a normalization cache;
a name normalizer executing on the processing unit to:
> receive a name for normalization during a name-based speech grammar generation;
> check a normalization cache for the received name;
> normalize the received name and add the normalization result to the normalization cache, when the received name is not in the normalization cache;
> retrieve the normalization result from the normalization cache;
> provide the normalization result to a next process in the name-based speech grammar generation;
> a plurality of normalization caches, where each normalization cache corresponds to a different culture; and
> the name normalizer further to provide a normalization result in a culture to the next process in a name-based speech recognition grammar generation specific to that culture.

17. The apparatus of claim 16, wherein the memory is a volatile memory and the normalization cache is generated on-the-fly for each generation of a name-based speech grammar.

18. The apparatus of claim 16, wherein the memory is a non-volatile memory and the normalization cache is persisted for a plurality of generations of a name-based speech grammar.

19. The apparatus of claim 18, wherein the normalization cache is persisted until at least one of:
> an expiration of the normalization cache, according to an assigned expiration date; or
> a difference between a current version of a source of names and a version of the source of names from a time when the normalization cache was generated exceeds a threshold.

20. The apparatus of claim 16 wherein each different culture is a different language culture.

* * * * *